July 18, 1967 G. E. BARKER ET AL 3,331,248
DIFFERENTIAL PRESSURE SENSOR
Filed Aug. 25, 1965 8 Sheets-Sheet 1

INVENTORS
GEORGE E. BARKER
GENE E. LIGHTNER
BY Robert J. Schaap
ATTORNEY

July 18, 1967 G. E. BARKER ET AL 3,331,248
DIFFERENTIAL PRESSURE SENSOR
Filed Aug. 25, 1965 8 Sheets-Sheet 3

INVENTORS
GEORGE E. BARKER
GENE E. LIGHTNER
BY
Robert J. Schaap
ATTORNEY

United States Patent Office 3,331,248
Patented July 18, 1967

3,331,248
DIFFERENTIAL PRESSURE SENSOR
George E. Barker, St. Louis, and Gene E. Lightner, Clayton, Mo., assignors to Monsanto Company, St. Louis, Mo., a corporation of Delaware
Filed Aug. 25, 1965, Ser. No. 482,351
13 Claims. (Cl. 73—398)

ABSTRACT OF THE DISCLOSURE

A differential pressure transducer comprising a suspending solenoid coil which suspends a magnetic sensory element, a detecting solenoid coil disposed beneath the suspending solenoid coil which provides a voltage output responsive to the movement of the sensory element therein. An electrical circuit provides an input to the suspending coil so that this input is balanced with the size of the sensory element to extract a square root function from the output, thereby providing a readout which is linear with respect to a change in pressure.

---

This application is a continuation-in-part of copending application Ser. No. 408,268, filed Nov. 2, 1964.

This invention relates in general to certain new and useful improvements in sensory transducers and more particularly, to differential pressure sensors capable of producing a signal which is linearly and directly related to flow changes.

Automatic control instrumentation has experienced a dynamic growth in recent years. As a result there has been a widespread employment of control instrumentation in many process industries. There has also been much development in the area of primary sensing devices which are capable of producing electric signals in proportion to changes of a sensed physical variable. For example, it is common to find light sensitive transducers such as the cadmium sulfide transducer used in the measurement of liquid level control and temperature control. Transducers of this type are designed to sense changes in the measured physical variable, and thereby energize a control mechanism which is capable of producing a control signal. The control signal is thereafter transmitted to a final control element for actuation of the control element in response to the change of the physical variable. Additionally, in many processes, it is desirable to know changes in pressure, temperature and other physical conditions.

However, the development of differential pressure transducers or sensors has not kept pace with the development of other automatic control equipment. One basic difficulty with the presently available differential pressure flow sensors resides in the fact that the primary element, the orifice, produces a differential pressure which is proportional to the square of the flow rate. Thus, the sensor generally provides an output reading which is linear in differential pressure and the sensor output is also linear in the square of the flow rate. A sensor output which is linear in the square of the flow rate is not particularly desirable for flow measurements. Consequently, it is always desireable to produce a signal which is linear in flow rate and, therefore, the existing sensory transducers employ a mechanical or electrical method of extracting the square root of the differential pressure signal.

The presently available equipment for extracting the square root of a signal to produce a signal linear in flow rate operates on any of the two basic principles. The first type of mechanism employs an analog square root extractor, where the square root of the flow rate signal is reduced to a linear function. The second type of apparatus employed uses a mercury displacement type differential pressure cell. This device operates on the principle of a "bob" which is suspended in a mercury liquid in a mercury vat and changes position responsive to pressures in a chamber. The change of pressure is directly transmitted to a mechanical system such as a cam which is capable of converting the square root signal into a linear signal. As a modification, a bell-shaped bob may be employed for directly converting a square root signal to a linear signal. However, each of these devices involves the employment of additional apparatus to perform another intermediate function before obtaining a flow rate signal. This intermediate function inherently introduces another source of error into the output reading and moreover, materially increases the cost of the differential pressure sensor.

It is, therefore, the primary object of the present invention to provide a differential pressure transducer which is capable of producing a linear signal in flow rate in response to an output linear in pressure differential.

It is another object of the present invention to provide a differential pressure transducer of the type stated which is capable of being employed in either plant-scale equipment, pilot-plant scale equipment or laboratory-scale automatic control equipment.

It is an additional object of the present invention to provide a differential pressure transducer of the type stated which is relatively economical to manufacture and which is highly precise and reliable.

It is also an object of the present invention to provide a differential pressure transducer of the type stated which is not affected by surface tension effects and frictional effects often present in laboratory-scale sensory equipment.

It is a further object of the present invention to provide a differential pressure transducer of the type stated which employs a magnetic suspension of the primary sensor and thereby eliminates all mechanical linkages and hysteresis associated therewith.

It is another salient object of the present invention to provide a differential pressure transducer of the type stated which is capable of being produced in small compact units and which are fairly rigid in their construction.

With the above and other objects in view, our invention resides in the novel features of form, construction, arrangement, and combination of parts presently described and pointed out.

Figure 9:
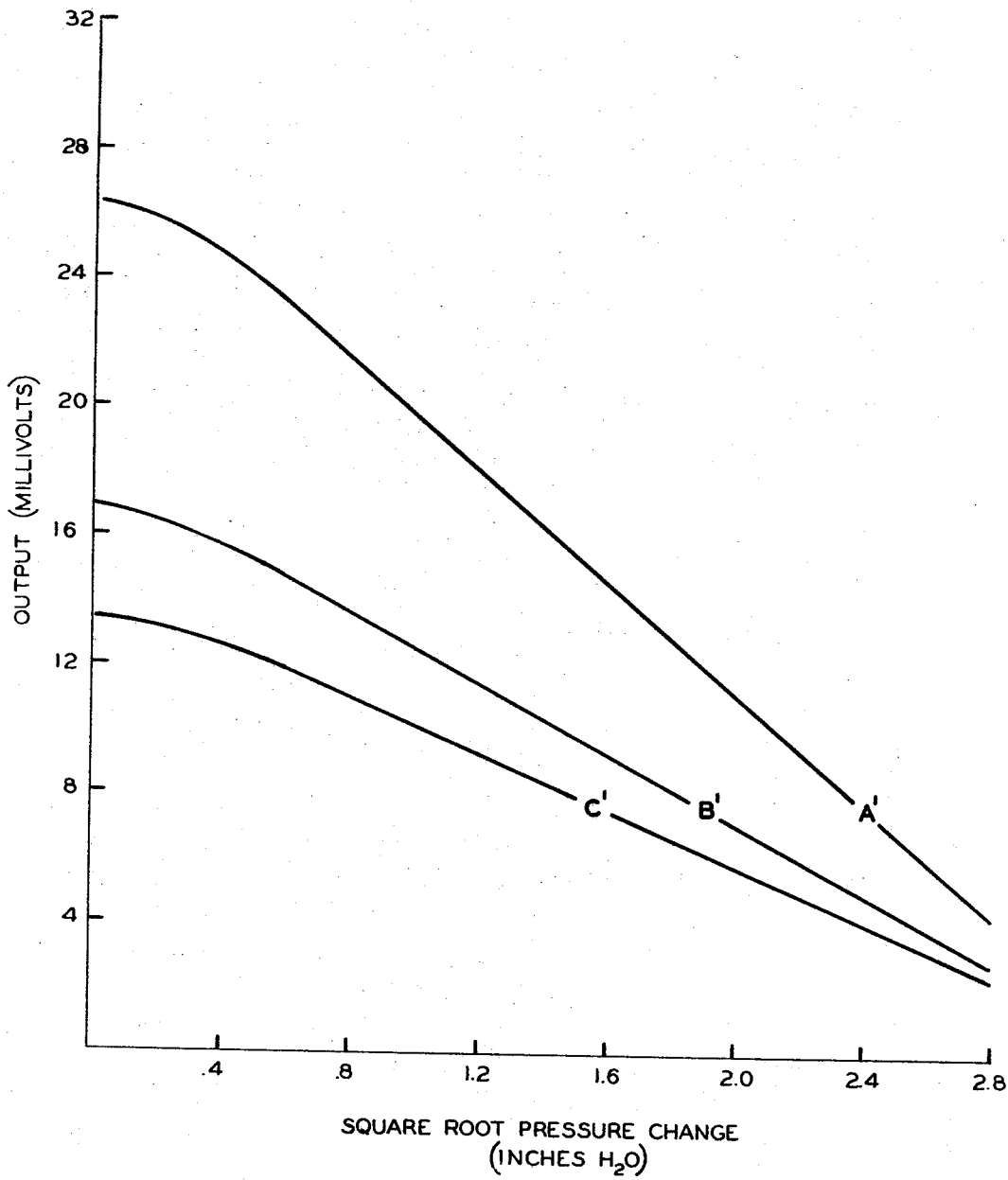
Figure 10:
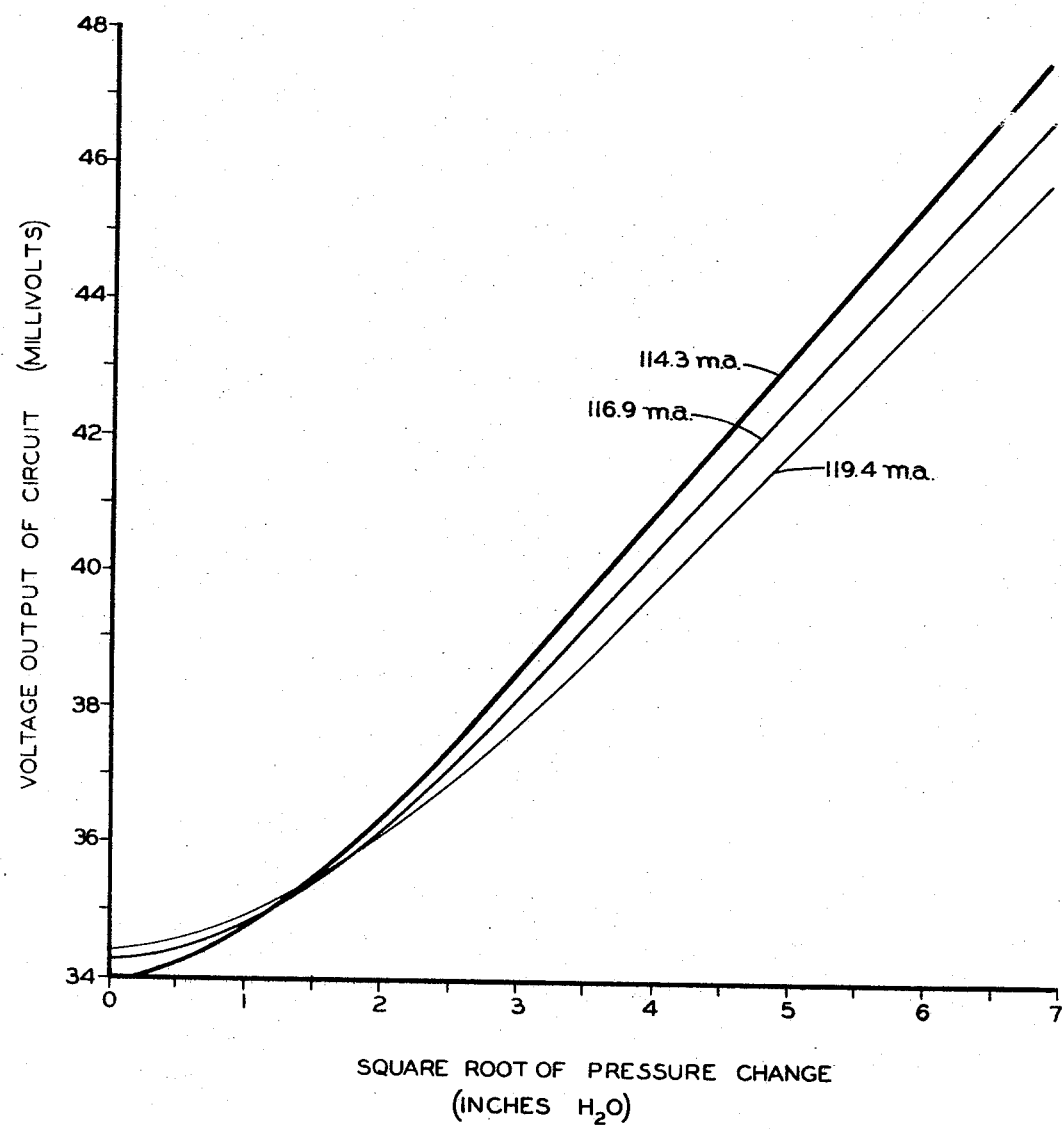

FIGURE 9 is a schematic illustration of a graph showing the square root of pressure change as a function of relative secondary voltage outputs for various sizes of sensory elements at various current levels; and FIGURE 10 is a schematic illustration of a graph showing the relative linear relationship of the square root of pressure change as a function of the circuit voltage output for various current levels employed in the differential pressure transducer of the present invention.

GENERAL DESCRIPTION

Generally speaking, the present invention provides a method and apparatus for sensing the change in a physical variable by generation of an electrical signal in direct proportion to the change of the physical variable. In general, the apparatus and the method of sensing is similar to the apparatus and method described in said copending application. More specifically, the apparatus of the present invention provides a direct and linear electrical signal which is linear in flow rate as a function of output which is linear in differential pressure. A sensory element or so-called "float" is disposed within a housing or tube which is, in turn, connected across an orifice or other reference point where a change in pressure is to be measured.

The differential pressure transducer includes a sensory element or so-called "bob" which contains a ferromagnetic core and is contained with a close-fitting, non-magnetic tube with the axis of the tube in a substantially vertical position. The lower end of the tube is connected to a high pressure source and the upper end is connected to the low pressure source so that the differential pressure to be measured is placed across the ends of the sensory element. Compensation for the gravitational force exerted upon the sensory element is made by suspending the sensory element in a weak magnetic field generated by an alternating current solenoid. The alternating current solenoid directly surrounds the non-magnetic tube. Disposed immediately beneath the primary coil which supports the sensory element, is a secondary coil which is designed to sense induced voltage. Movement of the sensory element in the secondary coil will induce a voltage variation therein on the operation of a motion-balance system.

The differential pressure transducer of the present invention operates on the principle of a non-linear force relationship due to a changing of magnetic permeance at the upper end of the alternating current solenoid. Accordingly, the sensory element is located so that substantially the greater portion of its length extends into the alternating current solenoid and only a small portion of the length extends into the secondary coil. Thus as the position of sensory element is changed due to a change in flow rate, the flux path at the upper end of the alternating current solenoid is changed. As a result thereof, the sensory element is shifted downwardly, a weaker flux path is created and this in effect, creates a weaker magnetic spring constant. In essence, there is a balancing of the length of the sensory element and the magnetic flux path at the upper end of the alternating current solenoid so that a desired square root relationship is achieved.

As a modification of the present invention, a Teflon or similar non-magnetic sheath is inserted in the non-magnetic tube for its entire length. The sensory element, therefore, is not provided with a non-magnetic sheath but is provided with a metallic sheath such as a stainless steel sheath. In this manner, both the sensory element and the housing are protected from any corrosive fluid. As another modification of the present invention, the primary solenoid coil can be designed with increasing coil turns at its lower end in order to provide the same result, namely the production of a signal which is linear in terms of flow rate.

DETAILED DESCRIPTION

Referring now in more detail and by reference characters to the drawings which illustrate practical embodiments of the present invention, A designates a differential pressure transducer, generally comprises an outer housing 1 which is preferably formed of a suitable ferromagnetic material and which is subdivided into the upper and lower sections 2, 3, respectively. The sections 2, 3 are provided with engageable terminal threaded ends 4 for rapid assembly and disassembly. Concentrically disposed within and extending axially through the housing 1 is a pressure tube 5, which is preferably formed of a non-magnetic material. The pressure tube 5 may be formed of any suitable plastic or synthetic resinous material which is inert with respect to the fluid contained therein. For the purposes of the present invention, the pressure tube 5 may be constructed of a transparent or opaque material, as desired.

Figure 1:
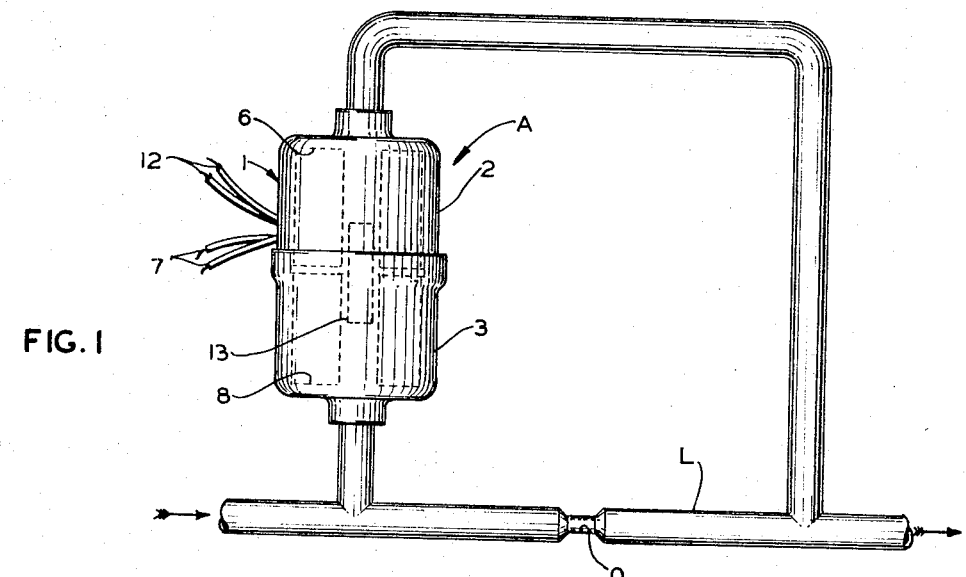
FIGURE 1 is a schematic front elevational view, partially broken away of a differential pressure sensor constructed in accordance with and embodying the present invention and showing the operative connection across a line orifice.

For purposes of describing the present invention, FIGURE 1 illustrates the operative connection of the differential pressure transducer A showing the operation in a condition where it is capable of measuring differential pressure. The lower end of the pressure tube 5 is connected to the high pressure source or upstream end of a tube or a fluid line L and the upper end of the tube 5 is connected to the downstream or low pressure source in the fluid line L. An orifice O is formed in the fluid line L intermediate to connections of the differential pressure transducer A to the low and high pressure sources. However, it should be understood that the differential pressure transducer A can be operatively connected in any type of system for measuring pressure differential and is not necessarily limited to the operative connection as schematically illustrated in FIGURE 1.

Figure 2:
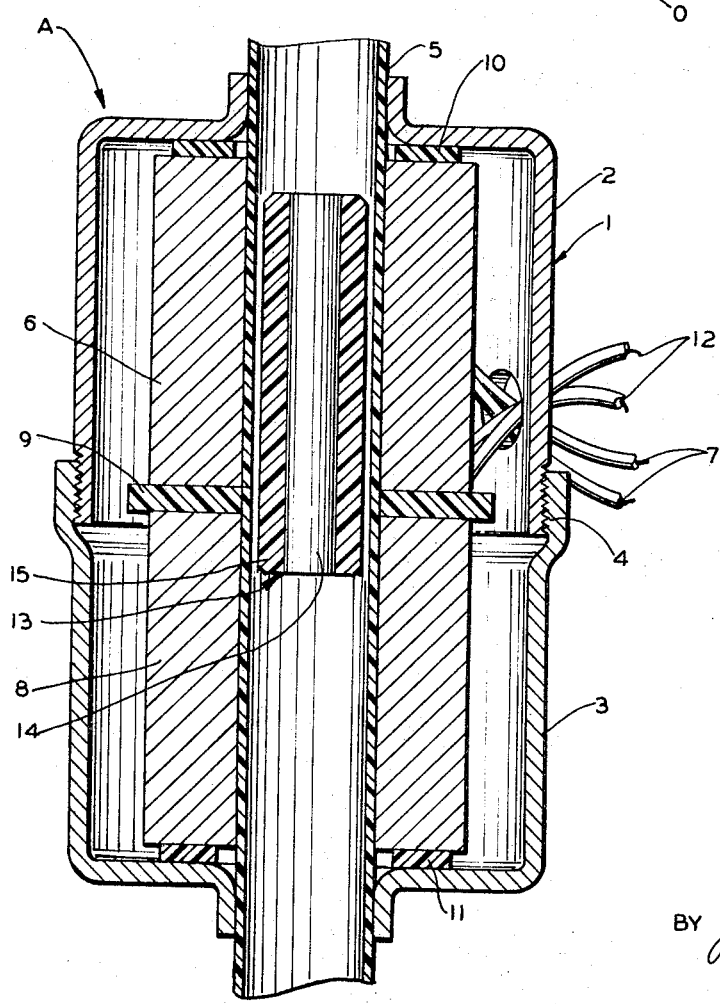
FIGURE 2 is a vertical section view, partially broken away, of a differential pressure transducer constructed in accordance with and embodying the present invention.

Fixedly mounted on and surrounding the tube 5 in a conventional manner is an alternating current solenoid 6, having a pair of conductors 7 which are electrically connected to a control circuit C, the latter being hereinafter described in detail. The control circuit C however, is designed to provide a source of alternating electrical current to the solenoid coil 6 for energization of the same and creation of a weak magnetic field. A second solenoid coil 8 is fixedly mounted on the tube 5 immediately beneath and in juxtaposition to the solenoid coil 6 in the manner as shown in FIGURE 2. Interposed between the solenoid coil 6, 8 is a non-magnetic spacer plate 9. Also interposed between the upper and lower ends of the housing 1 and the solenoid coils 6, 8 respectively are non-magnetic spacer rings 10, 11 all as can best be seen in FIGURE 2. The solenoid coil 8 is similarly provided with a pair of conductors 12 for operative connection to the control circuit C in a manner to be hereinafter described in detail. By reference to FIGURE 1, it can be seen that the coils 6, 8 have linearly spaced turns throughout their axial length.

Suspended within the fluid contained in the pressure tube 5 is a sensory element or so-called "float" or "bob" 13 which consists of a ferromagnetic core such as a soft iron core 14 surrounded by a Teflon sheath 15 formed of a tetrafluoroethylene polymer normally marketed under the name "Teflon." Moreover, any suitable plastic material or synthetic resin material which is capable of withstanding corrosion of the fluids contained within the pressure tube 5 may be employed with the differential pressure transducer A. As previously indicated, alternating electrical current is supplied by the control circuit C to the solenoid coil 6 and this alternating current is capable of generating a weak magnetic field which is just sufficient to overcome gravitational forces exerted on the sensory element 13 in the absence of a differential pressure so that the solenoid coil 6 has the characteristics of a very weak spring. In effect, the solenoid coil 6 serves as a "magnetic spring" which is considerably more reliable than an equivalent helical spring since there is no physical contact with the sensory element 13.

Use of alternating electrical current for powering the solenoid coil 6 introduces a further advantage to the differential pressure transducer A by causing the sensory element 13 to vibrate or "dither." The application of alternating electrical current to the coil 6 creates a pulsating magnetic field which causes low amplitude vibrations of the sensory element 13 at twice the line frequency of the current applied to the coil 6. These vibrations of the sensory element 13 are quite advantageous in that they eliminate surface tension effects and frictional effects which would be present if the coil were powered by a direct current source of power. In fact, by use of alternating electrical current and creation of a dither upon the sensory element 13, it has been found that surface tension effects in the tube 5 have been greatly reduced. Moreover, the differential pressure transducer A can also be advantageously employed in corrosive systems inasmuch as the tube 5 and the sheath 15 can be made of any non-corrosive plastic or stainless steel and similarly, the sensory element 13 remains enclosed within the Teflon sheath 15, thereby remaining substantially free from attack by any corrosive element.

By further reference to FIGURE 2, it can be seen that the overall length of the ferromagnetic core 14 is substantially equal to the length of either of the coils 6 or 8. Consequently, the magnetic core 14 is long enough to extend through a portion of each of the coils 6 and 8. Consequently, the magnetic core 14 is long enough to extend through a portion of each of the coil 6 and 8. Furthermore, it can be seen that the sheath 15 is sized so that it fits within the tube 5 with a very small tolerance, permitting very low quantities of fluid to pass between the sheath 15 and the interior wall of the tube 5.

The sensing of the movement of the sensory element 13 utilizes a principle similar to a linear variable differential transformer. The magnetic core 13 varies mutual inductance of the solenoid coils 6, 8 and thereby provides precise electrical indication of pressure change. As the magnetic core enters into the solenoid coil 8, the inductance of the coil increases in a manner roughly proportional to the amount of metal within the coil. The magnitude of the voltage induced in the coil 8 will, of course, depend upon the distance that the magnetic core 14 or the sensory element 13 is extended within the lower coil 8. Naturally, the greater the distance in which the core 13 is extended into the coil 8, the greater the voltage will be induced. Thus, it can be seen that inasmuch as the upper coil 6 is powered from a constant voltage source, this power source provides not only the magnetic spring force but also the primary excitation of the solenoid coil 8 which acts as a "detector" transformer.

The differential pressure transducer of the present invention operates on a principle that a non-linear force relation is obtained due to the change in magnetic permeance at the upper end of the solenoid coil 6. By reference to FIGURE 2, it can be seen that the top wall of the upper section 2 provides a means for carrying a magnetic flux path. In essence, the flux path extends through the ferromagnetic core 14 from the top wall of the section 2. As the sensory element 13 is located near the upper end of the coil 6, a greater magnetic permeance is maintained between the sensory element 13 and the housing 1. However as the sensory element 12 shifts downwardly the magnetic permeance is reduced and hence the magnetic force pulling the sensory element 13 within the coil 6 is substantially reduced. Accordingly, there is a non-linear relationship between the induced voltage in the solenoid coil 8 and the length of movement of the sensory element 13. The current to the solenoid coil 6 is adjusted with regard to the length of the magnetic core 14 so that a square root relationship is obtained. Furthermore, it can be seen that the voltage induced in the secondary solenoid coil 8 is a funtion of the portion of the magnetic core 14 extending therein. Therefore, the induced secondary voltage is related to the length of the sensory element 13. In effect, there is a balancing of the length of the ferromagnetic core 14 and the current applied to the coil 6 so that the square root relationship is achieved.

It must be recognized that a true square root relationship is not achieved due to the complexity of the changing flux path. However, this balancing can be so adjusted so that a very close approximation of the square root relationship is achieved. For the purposes of the present invention, it is to be observed that the sensory element 13 is located so that the greater portion of its length is disposed within the solenoid coil 6. Moreover, the number of turns in the solenoid coil 8 is so adjusted so that a portion of the sensory element 13 which extends in the coil 8 is sufficient to generate the desired secondary voltage.

This type of relationship is particularly desirable when attempting to measure pressure differential such as across an orifice. It is known that the flow characteristics of fluid past an orifice can be represented by the equation $W = K\sqrt{\Delta_p}$ where W is equal to the weight rate of flow of fluid, K is equal to a flow constant and $\Delta_p$ is the change in pressure. However, in pressure measurements, this proves to be an undesirable relationship. The basic difficulty with the presently available differential pressure flow sensors resides in the fact that the primary element, namely the orifice, produces a differential pressure which is proportional to the square of the flow rate. Thus, where the sensor provides an output which is linear in pressure differential, the sensor output is also linear in the square of the flow rate. This is a considerable drawback inasmuch as it is desirable to produce a signal which is linear in flow rate and which is capable of extracting the square root of the signal. In effect, the device of the present invention therefore produces a non-linear magnetic spring. The basic differential pressure sensitivity is reduced as the level of the differential pressure increases. This, in effect, is tantamount to "stiffening" of the magnetic spring as the sensory element 13 rises within the coil 6 due to the increasing differential pressure. Thus, as the sensory element 13 rises, a larger efficiency core diameter is maintained in the coil 6 which increases the magnetic efficiency of the circuit by reducing the effective air gap.

Figure 3:
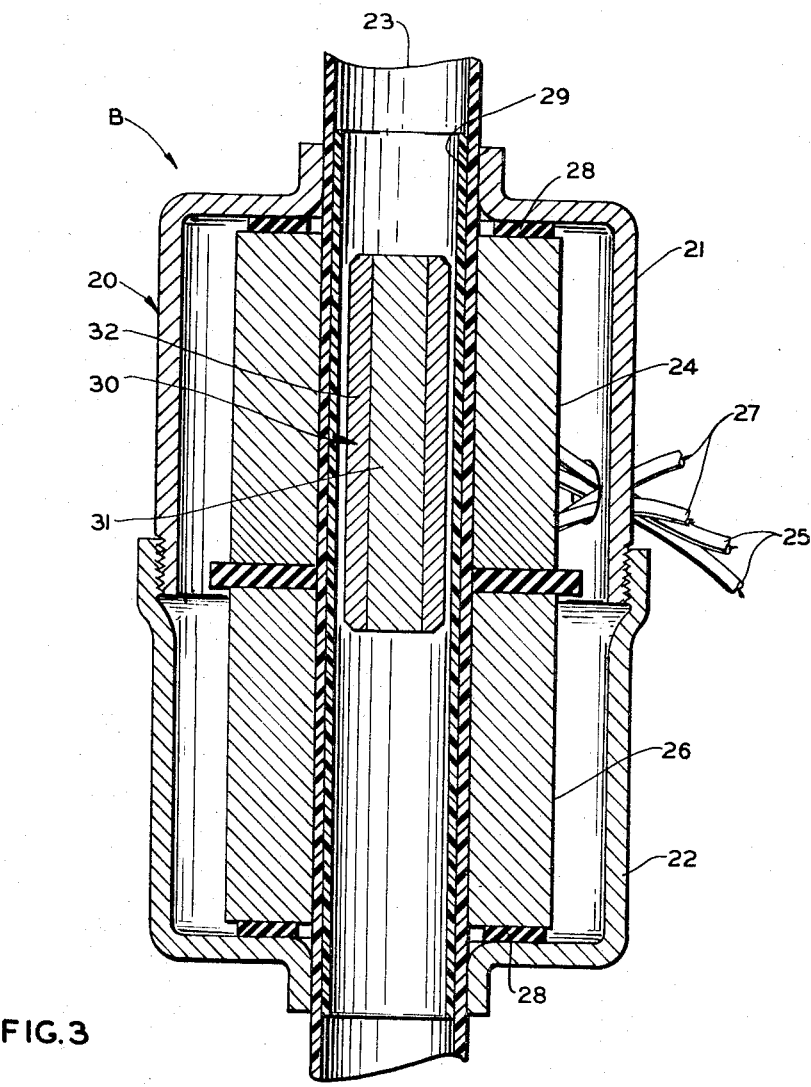
FIGURE 3 is a vertical sectional view, partially broken away, of a modified form of differential pressure transducer constructed in accordance with and embodying the present invention.

It is possible to produce a modified form of differential pressure transducer B, substantially as shown in FIGURE 3 and which is substantially similar to the previously described differential pressure transducer A. The differential pressure transducer B comprises an outer housing 20, which is subdivided into upper and lower sections 21, 22 respectively. The sections 21, 22 may be provided with engageable terminal ends for rapid assembly and disassembly. Concentrically disposed within and extending axially through the housing 20 is a pressure tube 23 which may be formed of any suitable plastic or synthetic resinous material which is inert with respect to the fluid contained therein. Again for the purposes of the present invention, the pressure tube 23 may be constructed of a transparent or opaque material, as desired.

Fixedly mounted on and surrounding the tube 23 in a conventional manner is an alternating current solenoid 24 having a pair of conductors 25, which are electrically connected to a control circuit C, the latter being hereinafter described in detail. The control circuit C is again designed to provide a source of alternating electrical current to the solenoid coil 24 for energization of the same and creation of a weak magnetic field. A second solenoid coil 26 is fixed mounted on the tube 23 in a manner as shown in FIGURE 3. The coil 26 is similarly provided with a pair of conductors 27 for ultimate connection to the electrical control circuit C. Again, non-magnetic spacer plates 28 may be inserted between each of the solenoid coils 24, 26 and non-magnetic spacer rings may also be inserted between the upper and lower ends of the housing 20 and the solenoid coils 24, 26, all as can best be seen in FIGURE 3. Inserted in the pressure tube 23 in fluid-tight engagement therewith is a non-magnetic sheath 29 and which may be formed of Teflon or any other suitable material which is inert with respect to the fluids to be contained in the pressure tube 23.

Suspended within the fluid contained in the pressure tube 23 is a sensory element or so-called "float" or "bob" 30 which generally comprises a soft iron or ferromagnetic core 31 and which is surrounded by a stainless steel sheath 32. It should be recognized that the sheath may be formed of any other material similar to stainless steel and which is inert with respect to any fluid which may be contained within the pressure tube 23.

Again, the differential pressure transducer B is connected so that the lower end of the tube 23 is in pressure communication with a high pressure source and the upper end of the tube 25 is in pressure communication with a low pressure source such as schematically illustrated in FIGURE 1. It should also be understood that the differential pressure transrducer B can be operative in any type of system for measuring pressure differential and is not necessarily limited to the type of operative connection as shown in FIGURE 1. The differential pressure transducer B operates in a manner similar to the pressure transducer A.

The differential pressure transducer B operates in a manner similar to the theory of operation of the transducer A. The use of the alternating electrical current for powering the solenoid coil 24 causes the sensory element 30 to vibrate or "dither." Application of this current to the coil 24, therefore, creates low amplitude vibrations of the sensory element. The sensing of the movement of the sensory element 30 utilizes the principle of the variable differential transformer. As the sensory element 30 lowers its position in the coil 24, the magnetic permeance at the upper end of the coil 24 is reduced due to the increase of air gap. Hence, the magnetic force pulling the sensory element 30 within the coil 24 is substantially reduced. Accordingly, the same non-linear relationship between the current applied to the coil 24 and the length of the ferromagnetic core 31 exists. It should also be recognized that the induced secondary voltage in the coil 26 is related to the length of the ferromagnetic core 31. Therefore, the magnetude of the voltage induced in the coil 26 will be dependent upon the distance that the ferromagnetic core 31 extends into the coil 26.

Figure 4:
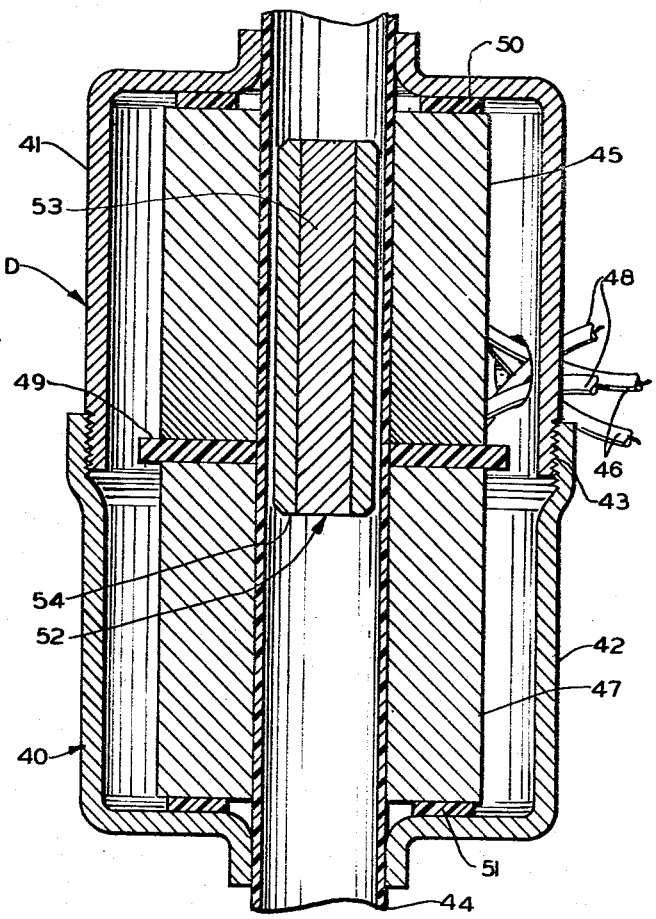
FIGURE 4 is a vertical sectional view, partially broken away of another modified form of differential pressure transducer constructed in accordance with and embodying the present invention.

It is possible to provide a modified form of differential pressure transducer D, substantially as shown in FIGURE 4 and which is substantially similar to the previously described differential pressure transducer A except that the transducer D provides a different mechanism for extracting the square root of the signal. The differential pressure transducer D generally comprises an outer housing 40, which is subdivided into upper and lower sections 41, 42 respectively. The sections 41, 42 are provided with engageable terminal threaded ends 43 for rapid assembly and disassembly thereof. The housing 40 is preferably formed of any suitable ferromagnetic material and serves as a magnetic return circuit. Concentrically disposed within and extending axially through the housing 40, is a pressure tube 44, which is preferably formed of a non-magnetic material such as a suitable plastic or synthetic resinous material, or any material which is inert with respect to the fluid contained therein. For the purpose of the present invention, the pressure tube 44 may be constructed of a transparent or opaque material as desired.

Again, the differential pressure transducer D is connected so that the lower end of the tube 44 is in pressure communication with a high pressure source and the upper end of the tube 44 is in pressure communication with a low pressure source, such as schematically illustrated in FIGURE 1. It should also be understood that the differential pressure transducer C can be operatively connected in any type of system for measuring pressure differential and is not necessarily limited to the type of operative connection shown in FIGURE 1. Fixedly mounted on and surrounding the tube 44 is an alternating current solenoid coil 45, having a pair of conductors 46 electrically connected to the control circuit C in a manner to be hereinafter described in detail. The solenoid coil 45 differs from the previously described solenoid coil 6 in that it does not have linearly spaced windings. The coil 45 is designed so that there is a larger concentration of windings at the lower end than at the upper end thereof. The number of windings proportionately decreases per unit of length from the lower end of the coil 45. Accordingly, by reference to FIGURE 4, it can be seen that the number of turns progressively decreases at the upper end and progressively increases toward the lower end of the coil. The control circuit D is again designed to provide a source of alternating electrical current to the solenoid coil 45 for energization of the same and creation of a weak magnetic field. However, the magnetic field generated will naturally be stronger at the lower end of the coil and weaker as the height of the coil increases.

A second solenoid coil 47 is fixedly mounted on the tube 44 immediately beneath and in juxtaposition to the solenoid coil 45, in the manner as shown in FIGURE 4. The coil 47 is similarly provided with a pair of conductors 48 for ultimate connection to the electrical control circuit C. Interposed between the solenoid coils 45, 47 is a non-magnetic spacer plate 49. Also interposed between the upper and lower ends of the housing 40 and the solenoid coils 45, 47 are non-magnetic spacer rings 50, 51 all as can best be seen in FIGURE 4.

Suspended within the fluid contained in the pressure tube 44 is a sensory element or so-called "float" or "bob" 52 which generally comprises a soft iron or ferromagnetic core 53 which is surrounded by a non-magnetic sheath 54. Again, the sheath 54 can be formed of Teflon or any other suitable material which is inert with respect to the fluid contained within the tube 44. By further reference to FIGURE 4, it can be seen that the ferromagnetic core 53 is completely enclosed within the sheath 54.

The theory of the operation of the differential pressure transducer D is slightly different than the theory of operation of the transducer A or B. In the differential pressure transducer D, the use of the alternating electrical current for powering the solenoid coil 45 will cause the sensory element 52 to vibrate or "dither" in the form of low amplitude vibrations. A non-linear force displacement relationship is also created by the variable air gap at the upper end of the sensory element 52 with respect to the housing 40. Again, the length of the sensory element 52 and particularly the ferromagnetic core 53 must be balanced with respect to the current applied to the solenoid coil 45. As the sensory element 52 shifts downwardly, the magnetic permeance at the upper end of the housing 40 is reduced and hence the magnetic force pulling the sensory element 52 within the solenoid coil 45 is substantially reduced.

The effect of the non-linear force displacement relationship which is created by the variable air gap is also supplemented by the so-called magnetic spring effect created by the concentrated windings at the lower end of the coil 45. As the element 52 shifts within the concentrated portion of the coil 45, there is a stiffening of a "magnetic spring." Accordingly, there is a cumulative effect of the changing flux pattern where the sensory element 52 shifts in the lower portion of the coil 45, and of the varying of the flux pattern at the upper end of the housing 40. Therefore, the movement of the sensory element 52 and the differential pressure transducer D creates a non-linear force displacement relationship by a slightly different mechanism.

Again, the sensing of the movement of the sensory element 52 utilizes the principle of the variable differential transformer. If the position of the sensory element 52 is lower in the coil 47, a larger efficiency core diameter is maintained in the coil 47 and a signal is produced in response thereto. Therefore, the inductance of the coil 47 increases in a manner roughly proportional to the amount of metal in the coil. The magnitude of the voltage induced in the coil 47 will, therefore, depend upon the distance that the magnetic core 53 is extended into the coil 47. Therefore, it can be seen that the coil 47 acts as a "detector transformer."

CONTROL CIRCUIT

Figure 5:
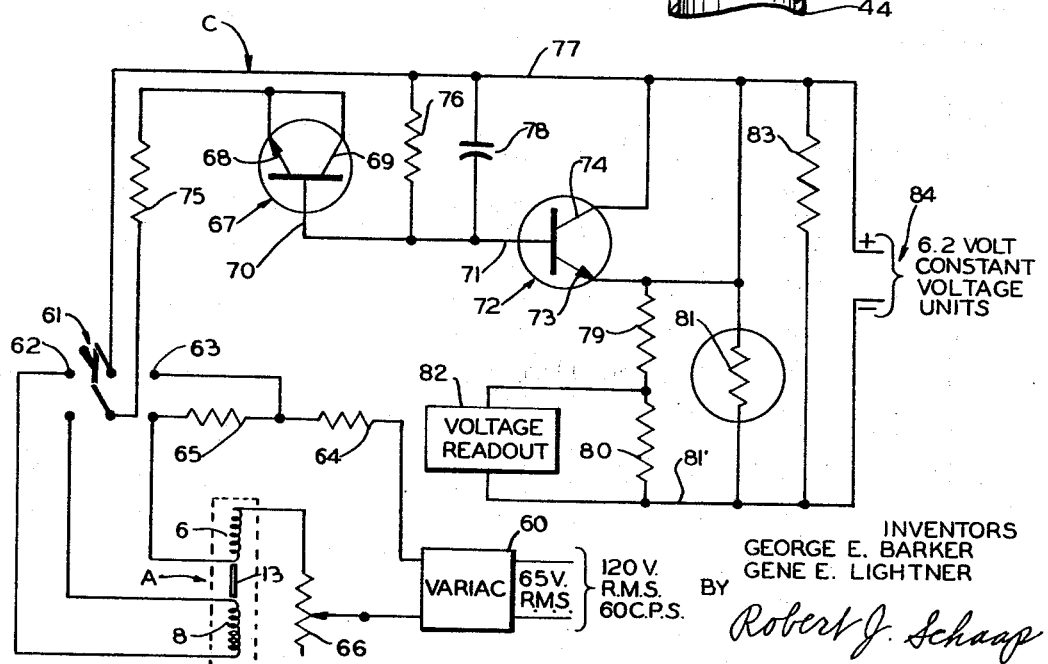
FIGURE 5 is a schematic illustration of a control circuit employed with the differential pressure transducer of the present invention.

The control circuit C for operation of the differential pressure transducer A or B is more fully illustrated in FIGURE 5. The control circuit C will be described in its operative connection to the differential pressure transducer A inasmuch as the connection and operation of the transducers B and D would be identical. As previously indicated, the only difference between the pressure transducer A and the pressure transducer D is that each employs a slightly different means for extracting the square root of the flow rate signal. However, this slightly different means for extracting the square root does not affect the operation of the control circuit C.

The control circuit C generally comprises a variable voltage source such as a Variac 60 which is capable of producing 65 volts (root mean square) of alternating current voltage and is electrically connected to one terminal of the solenoid coil 6. The other terminal of the Variac 60 is connected to one terminal of a fixed resistor 64, the later, in turn, being connected to a precision resistor 65, which serves as a transducer. The opposite terminal of the solenoid coil 6 is connected to the precision resistor 65 thereby completing a primary voltage circuit which consists of a series connection of the Variac 60 with the primary coil 6 and the fixed resistors 64, 65. Also operatively connected in series with the Variac 60 and the primary coil 6 is a potentiometer 66 for adjusting the voltage supplied to the primary coil by the Variac 60. A pair of leads are connected across the resistor 65 and are connected to an operation switch 61. The switch 61 includes contacts 62 which are connected to the solenoid coil 8 and contacts 63 which are connected to the leads from the resistor 65.

The circuit C also includes an NPN transistor 67 providing a base-emitter function, and serves as a rectifying diode. The transistor 67 includes an emitter 68, a collector 69 and a base 70, the latter of which is connected to a base 71 of another NPN transistor 72. The transistor 72 also includes an emitter 73 and a collector 74. The emitter 68 of the transistor 67 is connected through a fixed resistor 75 to one of the center contacts of the switch 61. The other center contact of the switch 61 is connected through a fixed resistor 76 to the base 70 of the transistor 67 and the base 71 of the transistor 72. The resistor 75 is designed to eliminate the effects of secondary resistance. The resistor 76 is necessary to prevent a back bias on the emitter 73 of the transistor 72. Consequently, the resistor 76 must have a certain minimum value necessary to perform this function.

One of the center terminals of the switch 61 is connected to a common conductor 77 and connected across the conductor 77 and the bases 70, 71 of the transistors 67, 72, respectively, is a capacitor 78, which serve a filtering function. The transistor 67 which serves only the function of a diode to rectify the AC voltage and the capacitor 78 and the resistor 76 will filter AC voltage to provide a DC signal. The transistor 72 generally is an emitter follower transistor and has a unity voltage gain. The emitter 73 is connected to a pair of fixed resistors 79, 80 and a temperature compensating resistor 81, such as a thermistor, all of which are connected in series. The resistors 80 and 81 are connected to a common conductor 81' as illustrated in FIGURE 5. A voltage readout device 82 is connected across the terminals of the fixed resistor 80. Moreover, connected to the common terminal of the resistor 80 and the readout device 82 and to the common conductor 77 is a fixed resistor 83, which is connected across a 6.2 volt direct current source 84, all as can best be seen in FIGURE 5.

The readout device 82 requires a large amount of current for operation with respect to the current normally provided by the rectified secondary coil voltage circuit. However, the transistor 72 has no current gain but has a large current output for withdrawal. Furthermore, the emitter 68 opposes the emitter 73 in the transistors 67, 72 respectively, in order to compensate for temperature changes. Therefore, it can be seen that the voltage output of the transistor 72 is equal to the voltage across the conductors 77, 81' minus the 0 to peak voltage across the conductor 77 and the emitter 68. The temperature compensating resistor 81 further compensates for residual temperature effects of the transistor 72. The resistor 83 provides a constant load compensation at one current level from the source 84. Furthermore, a Zener diode (not shown) at the source 84 may be employed. In essence, it can be seen that the circuit supplies a sense inversion.

In operation, either the differential pressure transducer A or the differential pressure transducers B or D is connected to the control circuit C and thereafter connected across a differential pressure source, substantially as shown in FIGURE 1. A pressure differential will cause the sensory element 13 to shift within the tube 5 until it attains an equilibrium position. The alternating electrical current for powering the solenoid 6 creates a vibration or "dither" thereby creating low amplitude vibrations of the sensory element 13 at twice the line frequency of the current applied to the coil 6. As a change in the pressure occurs, the sensory element 13 will shift in response thereto and more or less of the element 13 will be shifted within the coil 6 in response to the change in pressure. Moreover, the shifting of the sensory element 13 within the coil 8 will also induce a voltage proportional to the size of the core 14 contained within the coil 8.

In order to test the circuit for preparation, the switch 61 is shifted to the current adjusting position where it closes the contacts 63. At this point, the potentiometer 66 is adjusted to a fixed setting where a desired output is indicated on the readout device 82. The primary circuit is adjusted so that the resistance is sufficient to bring the primary circuit to a constant value. After the circuit has been correctly adjusted, the switch 61 is shifted to the measurement position where the contacts 62 are closed. In this case, a change in the position of the sensory element 13 will induce a voltage in a secondary coil 8. This change in the secondary voltage can be measured by the circuit C and read out on the readout device 82. In effect, it can be seen that the circuit C is designed to measure the peak voltage and more accurately, the ½ peak to peak voltage produced by a change in position of the sensory element 13.

The circuit is designed to provide a substantially constant current input to the detecting solenoid coil 6, which is sufficient to suspend the sensory element 13. Furthermore, since the current is alternating, it will provide a slight dithering effect, thereby overcoming any possibility of hysteresis. The current to the suspending coil 6 is adjusted with respect to the length of each of the solenoid coils and more particularly with respect to the length of the sensory element 13. The input current to the detecting coil 6 is regulated so that it is just sufficient to suspend the sensory element 13 in the desired position. This desired position is determined so that when the sensory element moves in the detecting solenoid coil 8, the signal generated in the detecting solenoid coil 8 will be a square root function of the pressure change. Accordingly, the electrical input to the detecting coil 6 is also balanced so that the portion of the sensory element 13 which shifts in the detecting solenoid coil 8 responsive to the change of pressure will extract a square root function. This will, in turn, produce an output signal from the detecting solenoid coil 8 which is linear with respect to the change of pressure.

The invention is further illustrated by, but not limited to the following examples:

*Example 1*

The differential pressure transducer A was analyzed for operating characteristics in an environment where it was capable of sensing a differential pressure. The primary and secondary coils employed in the transducer were Hoke Series 90 solenoid valve coils which were designed for 110 volts, 60 c.p.s. service. Each of the coils consisted of 4000 turns of No. 33 wire and had a 1¼" outer diameter by a ½" inner diameter. Moreover, each of the coils were 1¼" long. The coils were then cemented together in endwise abutment with a conventonal epoxy cement. The guide tube was constructed of a 304 stainless steel material having appropriate inlet and outlet fittings and had an overall outer diameter of ½" and an inner diameter of 7/16". The housing was formed of black iron pipe and had a 1.6" diameter by a length of 3". The sensory element was made from an 8–32 flat head machine screw having a length of 1¼" and which was totally encased in a Teflon jacket having an outer diameter of 0.430". The length of the Teflon jacket was 1.415" long and had a total weight of 9.1 grams. The sensory element was installed in the tube with the head of the screw in the downwardly presented position.

The circuit employed a variable voltage transformer (Variac) which was capable of producing 65 volts (root mean square value) for the primary circuit. The transistors employed were dual NPN Fairchild transistors SP8309. The remaining elements employed in the control circuit are listed below.

| | |
|---|---|
| Resistor 64 ohms | 270 |
| Resistor 65 do | 20 |
| Variable Resistor 66 do | 20 |
| Resistor 75 do | 1K |
| Resistor 76 do | 270K |
| Capacitor 78 microfarads | 1.0 |
| Resistor 79 ohms | 20K |
| Resistor 80 do | 300 |
| Resistor 83 do | 1K |
| Thermistor (temperature compensating resistor) 81 (Fernwell G128) at 25° C. ohms | 100K |

The primary current to the circuit was adjusted to provide minimum deviation from the desired square root output. The primary current was 115 milliamps (root mean square) which corresponded to a dissipation of approximately 3 watts.

The differential pressure transducer thus constructed was tested with an air flow at atmospheric pressure. The differential pressure was generated by a restriction of 0.067" diameter with a length of 0.125". An air flow of approximately 10,000 cubic centimeters per minute at standard temperature and pressure conditions generated at 7.5" water pressure change. This square root relationship holds for pressure drops greater than 2" of water. To provide the desired precision of the readout, 1.5% of the output voltage was fed to a Leeds & Northrup precision portable potentiometer. Differential pressure was measured by a 10 millimeter I.D. manometer of Miriam Red Oil with a column height measured to ±0.005". The calibration curve was represented by the following relationship:

$$\sqrt{\Delta_p} = 1.226 \text{ v.} - 2.687 \text{ in. (inches of } H_2O)^{1/2}$$

where v. is the voltage developed between the emitter and the negative power supply terminal.

It was established from the above test that the usuable range of the device which was determined at both extremes by linearity deviation, was 0.45 to 2.45 (inches of water)$^{1/2}$. Thus, the dynamic range was determined to be 5.4 and the maximum pressure drop was 6 inches of water. The voltage variation corresponding to full span change was approximately 1.64 volts. Other characteristics were measured and determined to be the following:

| | Percent of span |
|---|---|
| Reproducibility | ±0.07 |
| Hysteresis | <0.07 |
| Ambient temperature effects: | |
| 40 to 110° F. | ±0.1 |
| −20 to 140° F. | ±0.5 |
| Linearity maximum | ±1 |
| Drift over 50 hours | ±0.05 |
| Air flow through a sensor at maximum $\Delta_p$ cc./min. (S.T.P.) | 180 |

The flow rate through the sensory element was determined by the radial clearance between the sensory element and the tube which was 0.0037". This flow was low enough to be completely negligible in plant application a swell as most laboratory applications. In fact, it was found that the flow was sufficiently low so that it will not support a dirt particle large enough to bind the sensory element. Consequently, no filter was required. For liquid flows, larger radial clearances could be used and the clearance determined by the desired damping characteristics. Even with the air flow employed in the example, appreciable damping was observed. Moreover, it was determined that the device was almost completely insensitive to shock and vibration. Furthermore, it was determined that the sensory element can be completely removed and reinserted in any radial orientation with less than 0.05% offset.

Figure 6:
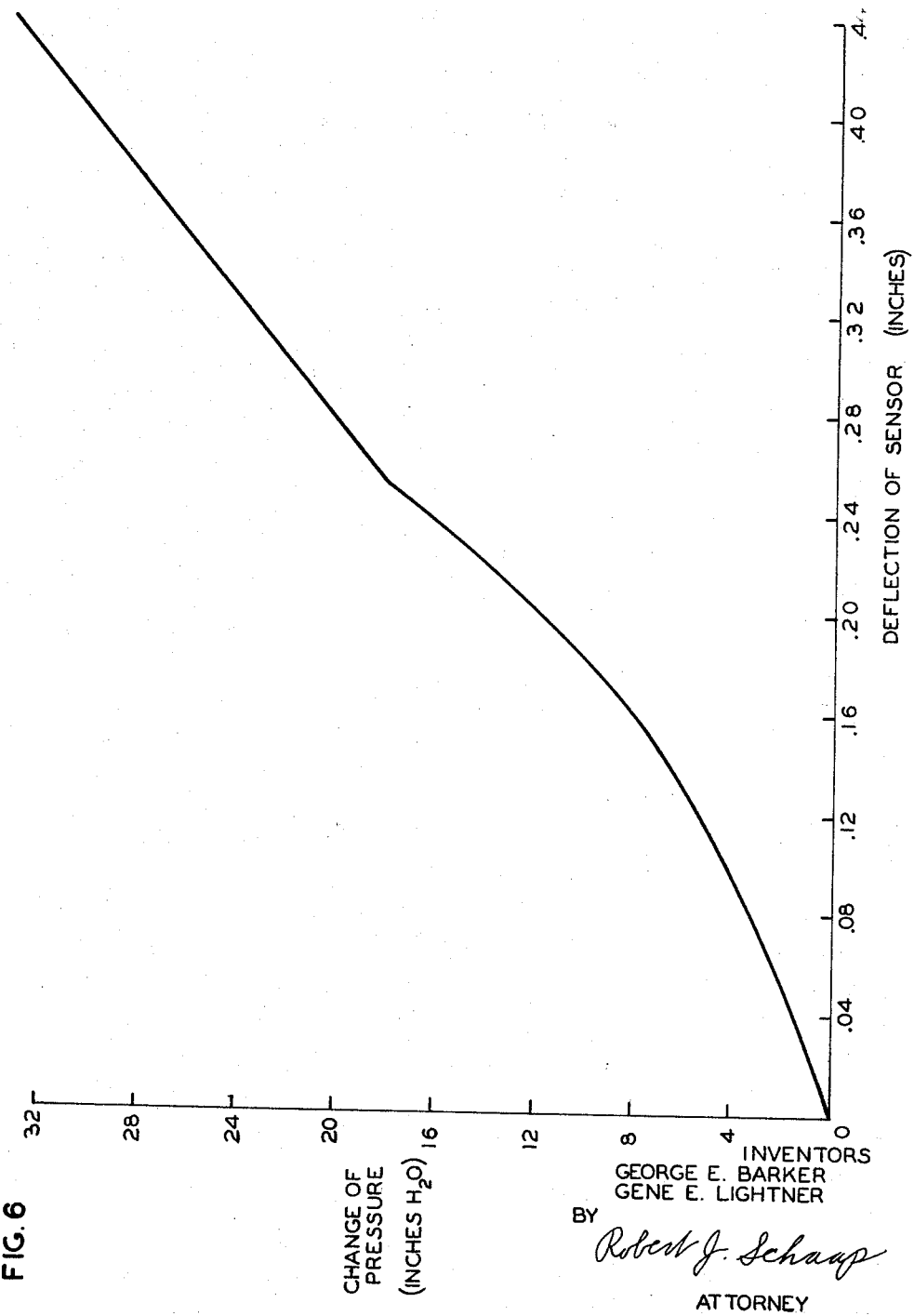
FIGURE 6 is a schematic illustration of a graph showing the magnetic spring characteristics of the differential pressure transducer of the present invention.

The magnetic spring characteristics of the differential pressure transducer were then determined with the device employed in the example. The characteristic of the magnetic spring is the effect created primarily by the solenoid coil 6 or the solenoid coil 25 and was determined by relating the units of pressure of water to the deflection of the sensory element. In essence, the pressure change was determined as a function of the deflection of the sensory element. FIGURE 6 is a schematic illustration of a graph showing the magnetic spring characteristics of the differential pressure transducer of the invention. The units of $\Delta_p$ and the inches of deflection are only relative in this plot, but the same relation exists between the pressure change and the deflection in absolute units the same as in relative units. By reference to FIGURE 6, it can be seen that a plot of the pressure change as a function of the deflection produces a curve to a point where the sensory element is balanced without the magnet. Thereafter, the relationship constitutes a straight line function. However, at the intersect of the straight line function and the curve, that is the balancing point without the magnet, is the point of no magnetic force. Moreover, a relatively straight core would produce a line which is parallel to the straight portion of the plot and which intersects the zero coordinates of each of the axis.

Figure 7:
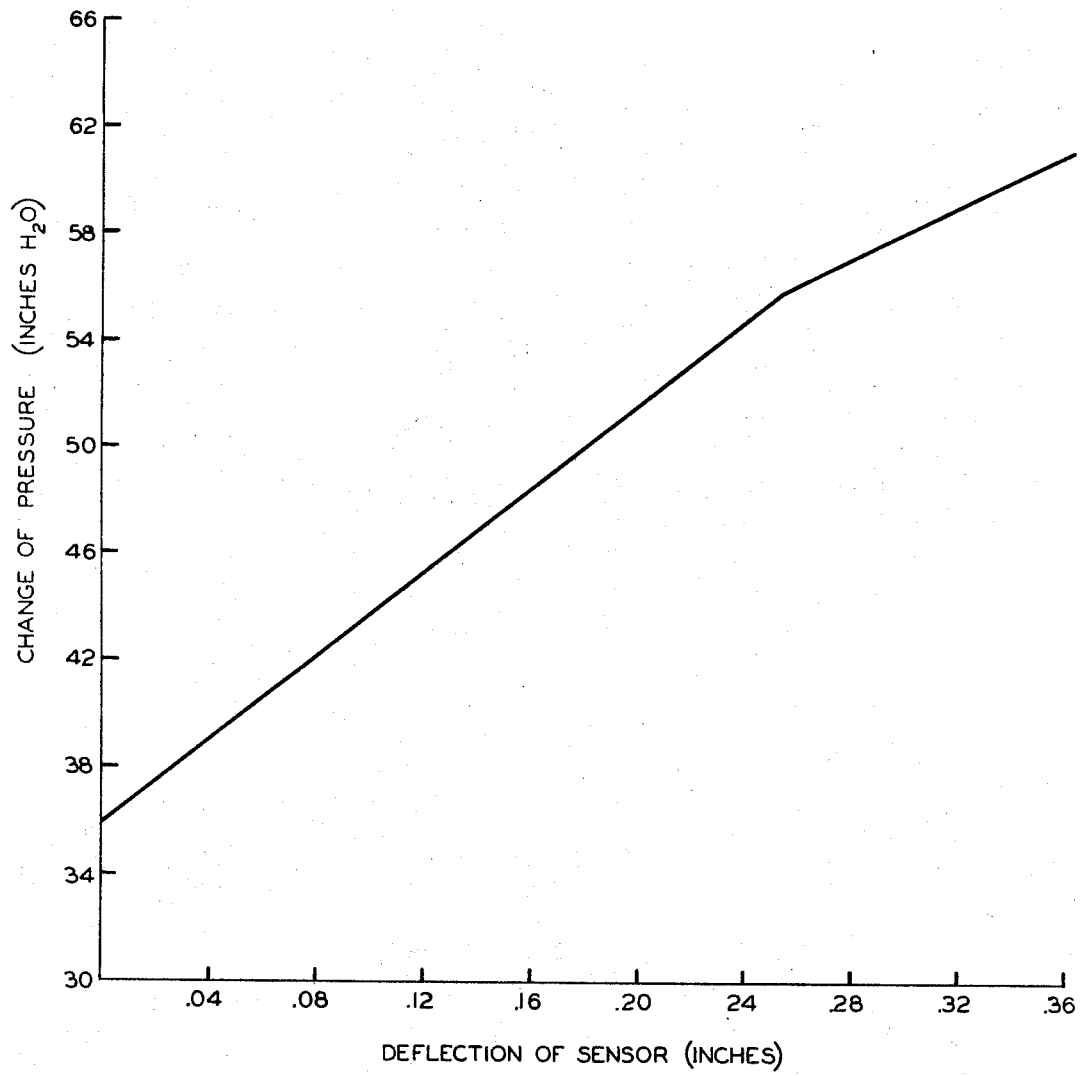
FIGURE 7 is a schematic illustration of a graph showing the variable transformer characteristics of the differential pressure transducer of the present invention.

The variable transformer characteristics of the pressure transducer of the present invention were then determined. One hundred and ten milliamperes (root mean square) at 31 volts (root mean square) was adapted as the primary power source. It was determined that a 56 millivolt output was equivalent to a 1.7 volt (root mean square) secondary voltage. Moreover, a 36 millivolt output was equivalent to a 2.66 volt (root mean square) secondary voltage. In order to obtain the variable transformer characteristics, the inches of deflection of the sensory element was plotted as a function of the voltage output. It can be seen by reference to FIGURE 7, which shows a schematic illustration of the variable transformer characteristics, that a straight line function was produced. Moreover, it was determined that the sensitivity of the device was equal to 0.0128 inch per millivolt.

Figure 8:
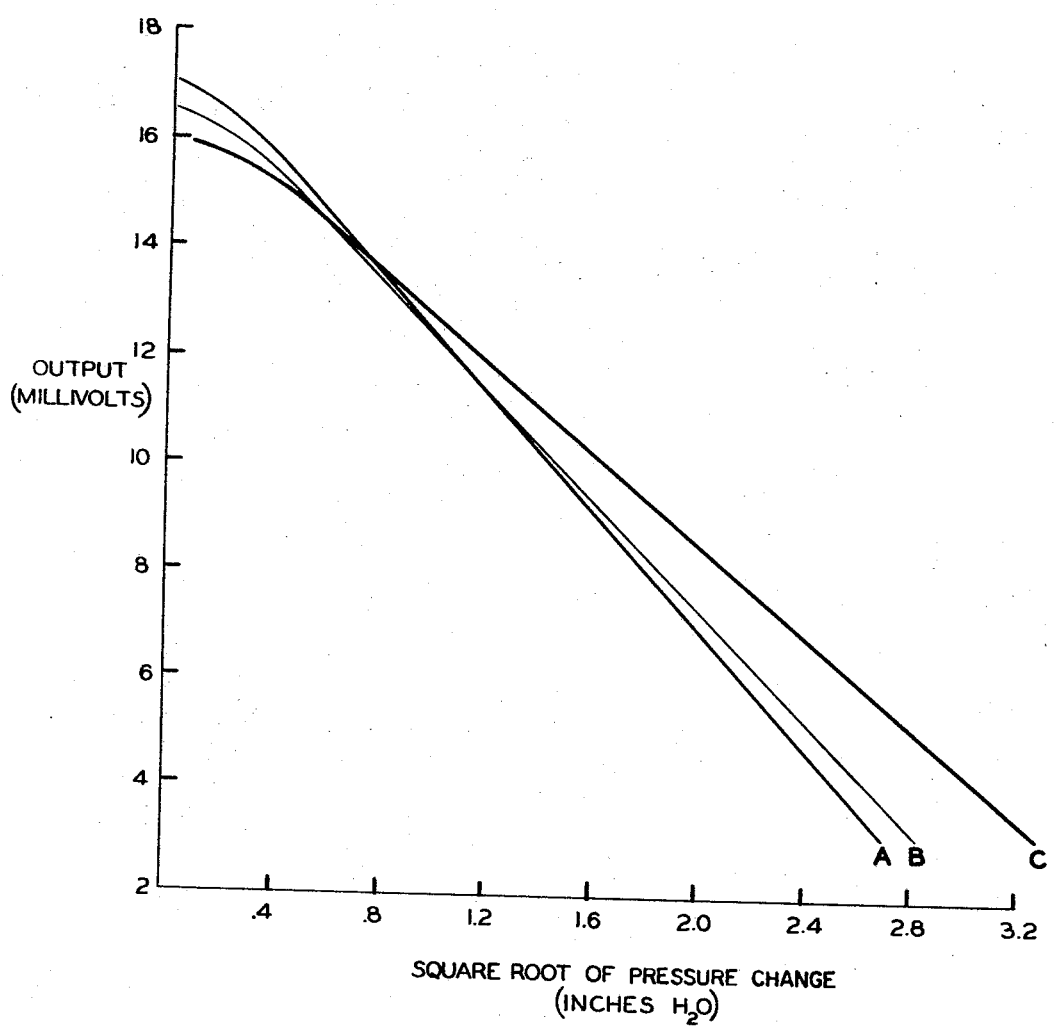
FIGURE 8 is a schematic illustration of a graph showing the linear relationship of the square root of pressure change as a function of relative secondary voltage outputs for various current levels employed in the differential pressure transducer of the present invention.

The schematic illustration of graphs shown in FIGURES 8 and 9 provide an indication of the strong relationship which exists between the size and shape of the magnetic core forming part of the sensory element and the current which is employed in the primary control circuit. FIGURE 8 provides a schematic illustration of a graph showing the linear relationship of the square root of pressure change as a function of the electrical output for various current levels employed in the differential pressure transducer A. FIGURE 8 on the other hand provides a schematic illustration of a graph showing the square root of pressure change as a function of the electrical output for various sizes of sensory element cores at various current levels. Referring again to FIGURE 8, it can be seen that this graph illustrates the function obtained by plotting the square root of pressure change as a function of millivolt output for 3 current levels designated as A, B and C on the plots. The first current level A was maintained at 112 milliamps (root mean square), the second current level B was maintained at 116 milliamps (root mean square) and the third current level C was maintained at 124 milliamperes (root mean square). It can be seen that in each case of plotting the square root of the pressure change as a function of the voltage output, substantially straight line functions were produced. Moreover, the slope of each of the lines for each current level differed slightly for the current levels employed. However, the results thus obtained are decisively an improvement over results obtained without extracting the square root value from the electrical output.

FIGURE 9 illustrates the effect of the electrical output from various sizes of sensory element cores by plotting the square root of the pressure change as a function of the millivolt output. Tests were made with three different sensory element cores, the first of which was 1½″ long, the second of which was 1¼″ long and the third of which was 1″ long. The diameter of each of the sensory elements was substantially identical. The plot of the pressure change as a function of the electrical output in terms of millivolts produced three curves, which are labeled A′, B′ and C′ for the three respective sensory element cores. The curve A′ represents the function for the 1½″ sensory element core, the curve B′ represents the function for the 1¼″ sensory element core and the curve C′ represents the function for the 1″ sensory element core. It can be seen that by changing the length of the sensory element a change in the span exists, but nevertheless a linear relationship between the voltage output and the pressure change is still maintained. Again, this is a decided improvement over the results obtained where the square root value is not extracted from the voltage output.

It is again pointed out that the value illustrated in the plots of FIGURES 5–9 are only relative values. However, it should be understood that the relative values have the same relationship as with positive values or absolute values as would absolute values.

*Example 2*

The differential pressure transducer B was analyzed for operating characteristics in an environment where it was capable of sensing a differential pressure. The primary and secondary coils employed in the transducer were Hoke Series 90 solenoid valve coils which were designed for 115 volt, 60 c.p.s. service. Each of the coils consisted of 4,000 turns of No. 33 wire and had a 1¼″ outer diameter by a ½″ inner diameter. Furthermore, each of the coils was 1¼″ long and was cemented together in endwise abutment with a conventional epoxy cement. The guide tube was constructed of a 304 stainless steel material having appropriate inlet and outlet fittings and an overall diameter of ½″ and an inner diameter of 0.430″. A Teflon liner was was press fitted in the guide tube. The Teflon liner was approximately 1.8″ long and had an inner diameter of approximately 0.246″. The housing was formed of black iron pipe and had a 1.6″ inner diameter by a length of 3″.

The sensory element was made from a piece of Carpenter silicon core iron, Type A-FM with a length of 1.250″ and an outer diameter of 0.1995″. The core was surrounded by a Type 303 stainless steel sheath. The overall sensory element had a length of 1.650″, and an outer diameter of 0.2405″ and the total overall weight of the sensory element was 9.218 grams.

The circuit employed a variable voltage transformer (Variac) which was capable of producing 65 volts (root mean square value) for the primary circuit. The remainder of the components employed in the control circuit were the same as the components employed in Example 1 and therefore are not described in detail herein. The remainder of the operation conditions were the same as employed in the analysis of the operating characteristics for the transducer A.

FIGURE 10 is a schematic illustration of a graph showing the linear relationship of the square root of pressure change as a function of the electrical output for various current levels employed in different pressure transformer B and is similar to the schematic illustration of FIGURE 8. This illustration provides an indication of the strong relationship which also exists between the size and shape of the magnetic core forming part of the sensory element and the current which is employed in the primary control circuit. It can be seen that FIGURE 10 illustrates the function obtained by plotting the square root of pressure change as a function of the millivolt output for 3 current levels which are designated on the plots. The first current level was maintained at 114.3 milliamps (root mean square), the second current level was maintained at a 116.9 milliamps (root mean square) and the third current level was maintained at 119.4 milliamps (root mean square). It can again be seen that in each case of plotting the square root of the pressure change as a function of the voltage output, substantially straight line functions were produced. It can also be seen that the results obtained are decisively an improvement over results without extracting the root value from the electrical output.

In obtaining the data for the plot of FIGURE 10, one square root differential pressure unit was equivalent to 0.453 (inches $H_2O$)$^{1/2}$ and 1 differential pressure unit was equivalent to 0.205 (inch $H_2O$).

It may be recognized from the above that the differential pressure transducer of the present invention could be used in other applications such as liquid level control, and in fluid flow rate control. Moveover, it is possible by simple modification to provide measurements other than square root measurement. For example, the upper permeance path could be modified to provide a 0.75 exponential function or a cube root function as may be desired. Various other functions such as a logarithmic function may also be achieved by sample modification of the apparatus of the present invention. Similarly, the primary or secondary coil in the differential pressure transducer B could be modified to provide the desired function.

It should be understood that changes and modifications in the form, construction, arrangement and combination of parts presently described and pointed out may be made and substituted for those herein shown without departing from the nature and principle of our invention.

Having thus described our invention what we desire to claim and secure by Letters Patent is:

1. A sensory transducer for measuring the change in a sensed physical variable, said transducer comprising a housing, a sensory element disposed within said housing and being movable responsive to changes in the sensed physical variable, a first alternating magnetic field means coupled with said sensory element for suspending the sensory element in a fluid medium associated with the sensed physical variable, a second magnetic field means disposed adjacent to and being located in proximate relation to said first magnetic field means, said sensory element being supported by said first magnetic field means so that a portion of the sensory element is always in each of said magnetic field means, said sensory element having a sufficient portion of its length in said first magnetic field means so that the magnetic permeance and flux path will change responsive to movement of said sensory element therein, said sensory element being formed of a magnetic material for coupling the flux of the first magnetic field means to the second magnetic field means and inducing in the second magnetic an output dependent on the position of the sensory element in said first and second magnetic field means, said second magnetic field means providing signals responsive to the position of said sensory element, and means for balancing the electrical input to said first magnetic field means with respect to the size of said sensory element so that a greater portion thereof extends into said first magnetic field means, said last named means also balancing the electrical input so that the portion of the sensory element which shifts into said second magnetic field means responsive to the change of the sensed physical variable extracts a multiple factor and produces an electrical output signal in said second magnetic field means which is linear with respect to the change of the sensed physical variable.

2. A sensory transducer for measuring the change in a sensed physical variable, said transducer comprising a housing, a sensory element disposed within said housing and being movable responsive to changes in the sensed physical variable, a first alternating magnetic field means coupled with said sensory element for suspending the sensory element in a fluid medium associated with the sensed physical variable, a second magnetic field means disposed adjacent to and being located in proximate relation to said first magnetic field means, said sensory element being supported by said first magnetic field means so that a portion of the sensory element is always in each of said magnetic field means, said sensory element having a sufficient portion of its length in said first magnetic field means so that the magnetic permeance and flux path will change responsive to movement of said sensory element therein, said sensory element being formed of a magnetic material for coupling the flux of the first magnetic field means to the second magnetic field means and inducing in the second magnetic field means an output dependent on the position of the sensory element in said first and second magnetic field means, said second magnetic field means providing signals responsive to the position of said sensory element, means for balancing the electrical input to said first magnetic field means with respect to the size of said sensory element so that a greater portion thereof extends into said first magnetic field means, said last named means also balancing the electrical input so that the portion of the sensory element which shifts into said second magnetic field means responsive to the change of the sensed physical variable extracts a multiple factor and produces an electrical output signal in said second magnetic field means which is linear with respect to the change of the sensed physical variable, and means operatively associated with said first magnetic field means for maintaining said sensing element under a constant dither.

3. A sensory transducer for measuring the change in a sensed physical variable, said transducer comprising a housing, a sensory element disposed within said housing and being movable responsive to changes in the sensed physical variable, a first alternating magnetic field means coupled with said sensory element for suspending the sensory element in a fluid medium associated with the sensed physical variable, a second magnetic field means disposed adjacent to and being located in proximate relation to said first magnetic field means, said sensory element being supported by said first magnetic field means so that a portion of the sensory element is always in each of said magnetic field means, said sensory element having a sufficient portion of its length in said first magnetic field means so that the magnetic permeance and flux path will change responsive to movement of said sensory element therein, said sensory element being formed of a magnetic material for coupling the flux of the first magnetic field means to the second magnetic field means, inducing in the second magnetic field means an output dependent on the position of the sensory element in said first and second magnetic field means, said second magnetic field means providing signals responsive to the position of said sensory element, each of said magnetic field means and said sensory element having substantially the same length, and means for balancing the electrical input to said first magnetic field means with respect to the size of said sensory element so that a greater portion thereof extends into said first magnetic field means, said last named means also balancing the electrical input so that the portion of the sensory element which shifts into said second magnetic field means responsive to the change of the sensed physical variable extracts a multiple factor and produces an electrical output signal in said second magnetic field means which is linear with respect to the change of the sensed physical variable.

4. A differential pressure transducer for measuring a change in pressure, said transducer comprising a housing, a sensory element disposed within said housing and being movable responsive to changes in pressure, a first alternating magnetic field means coupled with said sensory element for suspending the sensory element in a fluid medium associated with the source causing the pressure differential, and a second magnetic field means disposed adjacent to and being located in proximate relation to said first magnetic field means, said sensory element being supported by said first magnetic field means so that a portion of the sensory element is always in each of said magnetic field means, said sensory element having a sufficient portion of its length in said first magnetic field means so that the magnetic permeance and flux path will change responsive to movement of said sensory element therein, said sensory element being formed of a magnetic material for coupling the flux of the first magnetic field means to the second magnetic field means, inducing in the second magnetic field means an output dependent on the position of the sensory element in said first and second magnetic field means, said second magnetic field means providing signals responsive to the position of said sensory element, and means for balancing the electrical input to said first magnetic field means with respect to the size of said sensory element so that a greater portion thereof extends into said first magnetic field means, said last-named means also balancing the electrical input so that the portion of the sensory element which shifts into said second magnetic field means responsive to the change of pressure extracts a multiple factor and produces an electrical output signal in said second magnetic field means which is linear with respect to the change of pressure.

5. A differential pressure transducer for measuring a change in pressure, said transducer comprising a housing, a sensory element disposed within said housing and being movable responsive to changes in pressure, a first alternating magnetic field means coupled with said sensory element for suspending the sensory element in a fluid medium associated with the source causing the pressure differential, a second magnetic field means disposed adjacent to and being located in proximate relation to said first magnetic field means, said sensory element being supported by said first magnetic field means so that a portion of the sensory element is always in each of said magnetic field means, said sensory element having a sufficient portion of its length in said first magnetic field means so that the magnetic permeance and flux path will change responsive to movement of said sensory element therein, said sensory element being formed of a magnetic material for coupling the flux of the first magnetic field means to the second magnetic field means, inducing in the second magnetic field means an output dependent on the position of the sensory element in said first and second magnetic field means, said second magnetic field means providing signals responsive to the position of said sensory element, and means for balancing the electrical input to said first magnetic field means with respect to the size of said sensory element so that a greater portion thereof extends into said first magnetic field means, said last-named means also balancing the electrical input so that the portion of the sensory element which shifts into said second magnetic field means responsive to the change of pressure extracts a multiple factor and produces an electrical output signal in said second magnetic field means which is linear with respect to the change of pressure.

6. A differential pressure transducer for measuring a change in pressure, said transducer comprising a housing, a sensory element disposed within said housing and being movable responsive to changes in pressure, a first alternating magnetic field means coupled with said sensory element for suspending the sensory element in a fluid medium associated with the source causing the pressure differential, a second magnetic field means disposed adjacent to and being located in proximate relation to said first magnetic field means, said sensory element being supported by said first magnetic field means so that a portion of the sensory element is always in each of said magnetic field means, said sensory element having a sufficient portion of its length in said first magnetic field means so that the magnetic permeance and flux path will change responsive to movement of said sensory element therein, said sensory element being formed of a magnetic material for coupling the flux of the first magnetic field means to the second magnetic field means, inducing in the second magnetic field means an output dependent on the position of the sensory element in said first and second magnetic field means, said second magnetic field means providing signals responsive to the position of said sensory element, each of said magnetic field means and said sensory element having substantially the same length, and means for balancing the electrical input to said first magnetic field means with respect to the size of said sensory element so that a greater portion thereof extends into said first magnetic field means, said last-named means also balancing the electrical input so that the portion of the sensory element which shifts into said second magnetic field means responsive to the change of pressure extracts a multiple factor and produces an electrical output signal in said second magnetic field means which is linear with respect to the change of pressure.

7. The sensory transducer of claim 6 wherein the multiple factor being extracted from the signal is substantially a square root signal.

8. The differential pressure transducer of claim 4 wherein the multiple factor being extracted from the pressure differential is substantially a square root signal.

9. A sensory transducer for measuring the change in a sensed physical variable, said transducer comprising a housing, a sensory element disposed within said housing and being suspended in a fluid medium associated with the sensed physical variable, said sensory element also being movable responsive to changes in the sensed physical variable, a suspending solenoid coil surrounding said housing and providing an alternating magnetic field sufficient to suspend said sensory element in the fluid medium, said solenoid coil having a greater flux density at the upper end thereof, means for applying an alternating current to said suspending solenoid coil to maintain said sensory element under a constant dither, a detecting solenoid coil surrounding said housing and being disposed beneath and located in proximate relation to said suspending solenoid coil, said sensory element being supported by said alternating magnetic field so that a portion of the sensory element is always in each of said solenoid coils, said sensory element having a sufficient portion of its length in said suspending solenoid coil so that the magnetic permeance and flux path will change responsive to movement of said sensory element therein, said sensory element being formed of a magnetic material for coupling the flux of said suspending solenoid coil to said detecting solenoid coil, inducing in said detecting solenoid coil an output dependent on the position of the sensory element in said suspending and detecting solenoid coils, said sensory element exciting a voltage signal in said detecting solenoid coil responsive to the position of said sensory element therein, said sensory element having substantially the same effective length as each of said solenoid coils, and means for balancing the electrical input to said suspending solenoid coil with respect to the size of said sensory element so that a greater portion thereof extends into said first magnetic field means, said last-named means also balancing the electrical input so that the portion of the sensory element which shifts into said detecting solenoid coil responsive to the change of the sensed physical variable extracts a multiple factor and produces an electrical output signal in said detecting solenoid coil which is linear with respect to the change of the sensed physical variable.

10. A differential pressure transducer for measuring a change in pressure, said transducer comprising a housing, a sensory element disposed within said housing and being suspended in a fluid medium associated with the source causing the pressure differential, said sensory element also being movable responsive to changes in the pressure, a suspending solenoid coil surounding said housing and providing an alternating magnetic field sufficient to suspend said sensory element in the fluid medium, said solenoid coil having a greater flux density at the upper end thereof, means for applying an alternating current to said suspending solenoid coil to maintain said sensory element under a constant dither, a detecting solenoid coil surrounding said housing and being disposed beneath and located in proximate relation to said suspending solenoid coil, said sensory element being supported by said alternating magnetic field so that a portion of the sensory element is always in each of said solenoid coils, said sensory element having a sufficient portion of its length in said suspending solenoid coil so that the magnetic permeance and flux path will change responsive to movement of said sensory element therein, said sensory element being formed of a magnetic material for coupling the flux of said suspending solenoid coil to said detecting solenoid coil, inducing in said detecting solenoid coil an output dependent on the position of the sensory element in said suspending and detecting solenoid coils, said sensory element exciting a voltage signal in said detecting solenoid coil responsive to the position of said sensory element therein, said sensory element having substantially the same effective length as each of said solenoid coils, and means for balancing the electrical input to said suspending solenoid coil with respect to the size of said sensory element so that a greater portion thereof extends into said first magnetic field means, said last-named means also balancing the electrical input so that the portion of the sensory element which shifts into said detecting solenoid coil responsive to the change of pressure extracts a multiple factor and produces an electrical output signal in said detecting solenoid coil which is linear with respect to the change of pressure.

11. The sensory transducer of claim 9 wherein the multiple factor being extracted from the signal is substantially a square root signal.

12. The differential pressure transducer of claim 10 wherein the multiple factor being extracted from the pressure differential is substantially a square root signal.

13. A differential pressure transducer for measuring the change in pressure, said transducer comprising a housing, a sensory element disposed within said housing and being movable responsive to changes in pressure, a first alternating magnetic field means coupled with said sensory element for suspending the sensory element in a fluid medium associated with the source causing the pressure differential, and a second magnetic field means disposed adjacent to and being located in proximate relation to said first magnetic field means, said sensory element being supported by said first magnetic field means so that a portion of the sensory element is always in each of said magnetic field means, said sensory element being formed of a magnetic material for coupling the flux of the first magnetic field means to the second magnetic field means, and inducing in the second magnetic field means an output dependent on the position of the sensory element in said first and second magnetic field means, said second magnetic field means providing signals responsive to the position of said sensory element, said first magnetic field means including an energizable coil having a larger coil density at one end than at the other for creating a differential flux path across the length of the coil, the coil density differential being sized to extract a multiple factor from the pressure differential, thereby providing a linear relation between the pressure differential and the electrical output signal.

References Cited
UNITED STATES PATENTS

| | | | |
|---|---|---|---|
| 2,903,678 | 9/1959 | Wills | 73—313 X |
| 2,911,828 | 11/1959 | Keating et al. | 73—309 X |
| 3,024,659 | 3/1962 | White. | |
| 3,210,746 | 10/1965 | Clapp | 340—199 |
| 3,247,499 | 4/1966 | Dumpleton et al. | 73—205 X |

LOUIS R. PRINCE, *Primary Examiner.*

D. O. WOODIEL, *Assistant Examiner.*